(No Model.)
N. O. SWENSON.
WATER TUYERE FOR FORGES.
No. 261,784. Patented July 25, 1882.
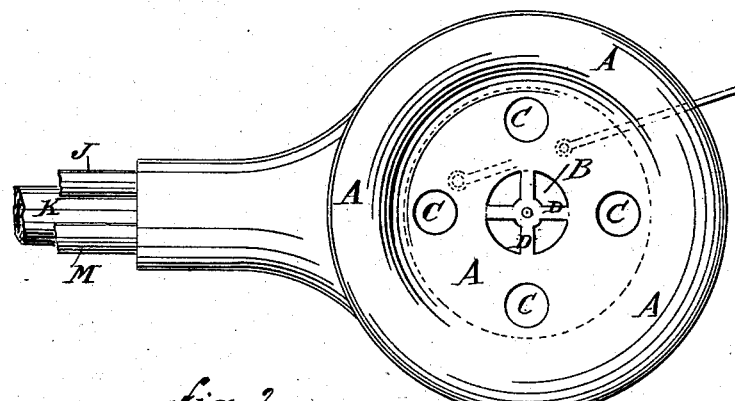
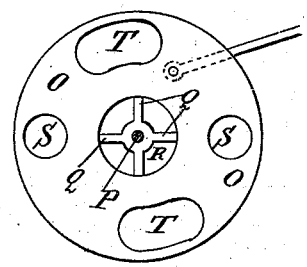
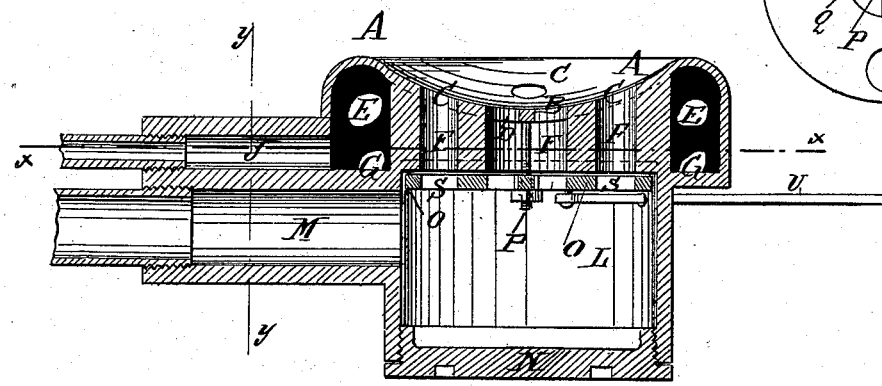
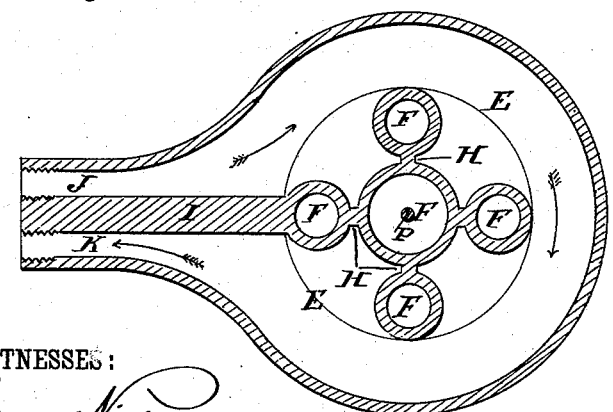
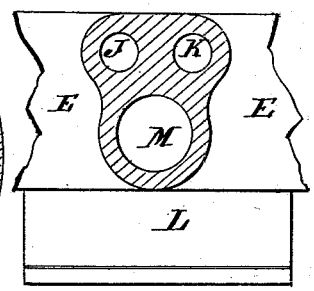
WITNESSES:
Chas. Nida
C. Sedgwick
INVENTOR:
N. O. Swenson
BY Munn & Co
ATTORNEYS.

United States Patent Office.

NILS O. SWENSON, OF TERRAVILLE, DAKOTA TERRITORY.

WATER-TUYERE FOR FORGES.

SPECIFICATION forming part of Letters Patent No. 261,784, dated July 25, 1882.

Application filed January 23, 1882. (No model.)

*To all whom it may concern:*

Be it known that I, NILS OLOF SWENSON, of Terraville, Lawrence county, Dakota Territory, have invented a new and useful Improvement in Water-Tuyeres for Forges, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a sectional side elevation of the same. Fig. 3 is a sectional plan view of the same, taken through the line *x x*, Fig. 2. Fig. 4 is a plan view of the regulating-plate; and Fig. 5 is a sectional elevation of a part of the same, taken through the line *y y*, Fig. 2.

The object of this invention is to facilitate the controlling and regulating of the air-blast in water-tuyeres and secure a free circulation of water in the parts exposed to the heat.

A represents the face-plate of the tuyere, which I prefer to make concave, as shown in Figs. 1 and 2, but which may be made level or convex, if desired.

In the center of the face-plate A is formed a large opening, B, surrounded by four equidistant smaller openings, C.

The center opening, B, is provided with crossed bars D, to prevent large pieces of coal from falling through the opening into the air-chamber, hereinafter described.

Beneath the face-plate A is formed the water-chamber E, through which pass the air pipes or passages F.

The upper ends of the air-pipes F are connected with the openings B C in the face-plate A, and their lower ends are connected with openings in the valve-plate O.

The air-pipes F are connected by webs H, and one of the side pipes is connected with the partition I between the inlet water-passage J and the outlet water-passage K. With this construction the water-chamber E becomes a passage connecting the inlet-passage J and the outlet-passage K.

With the outer ends of the passages J K are designed to be connected the pipes through which the water is conducted to and from the tuyere.

The water can be drawn out of the water-chamber through a discharge-cock connected with the inlet-pipe, or the cock that opens and closes the inlet-pipe can be so formed as to open a discharge-aperture when turned to prevent the ingress of water.

Beneath the base-plate G of the water-chamber E is formed the air-chamber L, into which air is introduced from a bellows or fan-blower through the passage or pipe M, and from which the air passes to the fire through the pipes F.

The air-chamber L is provided with a detachable bottom, N, to serve as a door for the convenient removal of ashes, small coals, and cinders that may fall through the air-pipes F into the said air-chamber L.

The passage of the air through the pipes F is controlled by the valve-plate O, which is placed and revolves beneath the base-plate G of the water-chamber E.

The plate O can be supported upon lugs or shoulders formed upon the bottom plate, G, or it can be suspended from the crossed bars D by a pivot-bolt, P, attached to the said crossed bars D, and passing through cross-bars Q, secured in the central opening, R, of the said plate O, which opening corresponds with the opening of the center air-pipe F.

In the plate O, upon the opposite sides of the center opening, R, are formed two openings, S, corresponding in size and position with two of the pipes F.

In the plate O are also formed two elongated openings, T, corresponding with the two other air-pipes F. With this construction, by turning the plate O all the air-pipes F can be left fully open, or the side pipes can be left open and the longitudinal pipes closed, or the longitudinal pipes can be left open and the side pipes closed, or all the pipes can be partly closed, as the work to be done may require.

The valve-plate O can be turned by a lever or push-rod, U, which passes in through a hole in the wall of the air-chamber L, and is pivoted to the said plate O near its center opening, R, a quarter-revolution of the plate O being sufficient to make all necessary adjustments.

Having thus described my invention, I claim as new and desire to secure by Letters Patent—

1. A water-tuyere constructed substantially as herein shown and described, and consisting of the face-plate A, having air-pipes F, the water-chamber surrounding the air-pipes and provided with inlet and outlet passages J K, the air-chamber L, and the adjustable valve-plate O, as set forth.

2. In a water-tuyere, the combination, with the face-plate A, having apertures C and the water-chamber E, having inlet and outlet passages J K, of the air-pipes F, connected by webs H, substantially as herein shown and described, whereby the water is made to circulate around the said pipes, as set forth.

3. In a water-tuyere, the combination, with the air-pipes F, of the valve-plate O, having apertures R S T, substantially as herein shown and described, whereby the passage of air through the said pipes can be regulated and controlled, as set forth.

4. In a water-tuyere, the valve-plate O, having center apertures, R, side apertures, S, and elongated apertures T, substantially as herein shown and described, to adapt it for use in regulating the air-blast, as set forth.

5. In a water-tuyere, the combination, with the adjustable valve-plate O and the wall of the air-chamber L, of the lever U, substantially as herein shown and described, whereby the said valve-plate can be readily adjusted, as set forth.

6. The combination, with the face-plate A, having cross-barred central opening, B, and the openings C, of the air-pipes F, rotary valve-plate O, having holes R S T, and air-chamber L, having an inlet-pipe, M, as and for the purpose specified.

7. The tuyere air-pipes F, connected by webs H, and with the partition I, in combination with the surrounding water-chamber E, having an inlet, J, on one side of said partition, and an outlet, K, on the other side, whereby the continuous circulation of water may be easily maintained, as set forth.

8. The tuyere valve-plate O, combined with a screw-pivot, P, carrying an end nut and projecting centrally from the cross-bars D, as and for the purpose specified.

NILS OLOF SWENSON.

Witnesses:
AUGUST HANSON,
OLEY MATSON.